United States Patent [19]

Jones

[11] 4,373,328

[45] Feb. 15, 1983

[54] THRUST REVERSER

[75] Inventor: Robert A. Jones, Madison, Conn.

[73] Assignee: United Technologies Corporation, Hartford, Conn.

[21] Appl. No.: 199,403

[22] Filed: Oct. 22, 1980

[51] Int. Cl.³ .................. F02K 3/06; B64C 15/06
[52] U.S. Cl. .................. 60/226.2; 60/230; 60/232; 239/265.27; 239/265.31
[58] Field of Search .......... 60/226 A, 230, 232; 181/222; 239/265.27, 265.31

[56] References Cited

U.S. PATENT DOCUMENTS

| 3,036,431 | 5/1962 | Vdolek | 239/265.31 |
| 3,477,231 | 11/1969 | Paulson | 181/222 |
| 3,598,318 | 8/1971 | Schiel | 60/226 A |
| 3,608,314 | 9/1971 | Colley | 60/226 A |
| 3,721,389 | 3/1973 | MacKinnon | 181/222 |
| 3,875,742 | 4/1975 | McMurtry | 60/226 A |
| 4,073,440 | 2/1978 | Hapke | 60/226 A |

FOREIGN PATENT DOCUMENTS 1386232  3/1975  United Kingdom .......... 239/265.31

Primary Examiner—Douglas Hart
Attorney, Agent, or Firm—Norman Friedland

[57] ABSTRACT

A thrust reverser for a fan jet engine having a splitter in the fan duct in a plane with the fixed cascades is designed with blocker doors positioned to block flow between the splitter and the outer wall when in the deployed position. The splitter and supports are positioned to simultaneously uncover the cascades and block flow in the remaining portion of the duct. This design contemplates elimination of the blocker door drag links that typically extends into the duct passageway.

4 Claims, 3 Drawing Figures

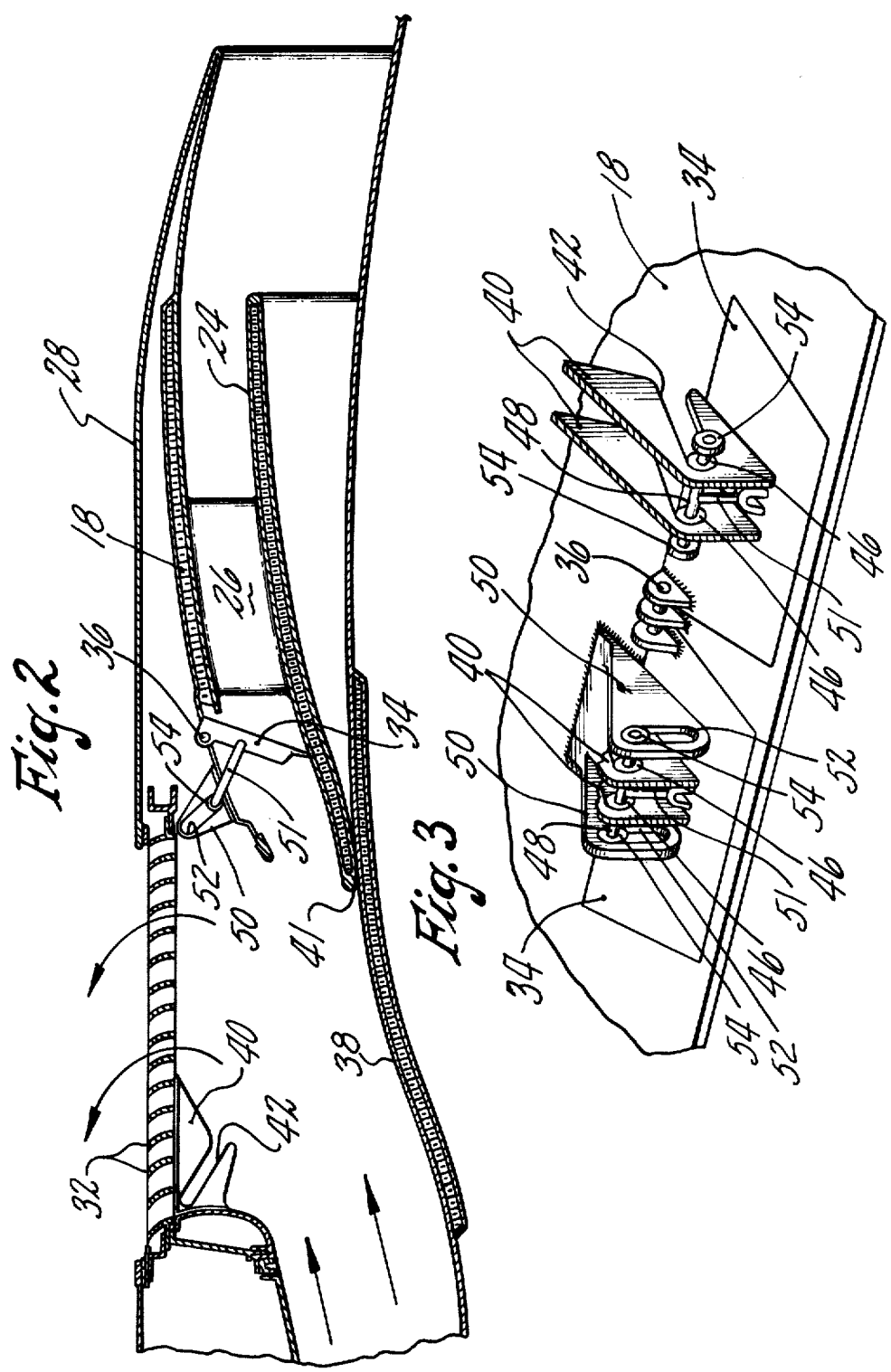

THRUST REVERSER

DESCRIPTION

1. Technical Field

This invention relates to fan jet engines and more particularly to thrust reversers therefor.

2. Background Art

As is well known, thrust reversers serve to change direction of the accelerated gases in a turbine type power plant to effuctuate braking of the aircraft. A well known system for thrust reversing is to expose the working medium to ambient through fixed cascades that serve to change direction of the air as it is being expelled. Typically, sliding duct walls are translated axially exposing the cascades while blocker doors are rotated into position to prevent the working medium to flow axially out of the exhaust duct.

A system exemplifying thrust reversal is shown in U.S. Pat. No. 3,511,055 granted to N. H. Timms on May 12, 1970. As shown therein the blocker door is rotated radially inwardly to block axial duct flow and the duct wall is positioned axially to expose the duct air to the cascades.

This invention constitutes an improvement over the structure disclosed in the U.S. Pat. No. 3,511,055, supra by taking advantage of the splitter disposed inside the duct. In this invention the splitter is moved axially and is contoured such that it cooperates with an inner duct to form a blockage. This leaves only the upper portion of the duct exposed to axial flow and a blocker door is utilized to effectuate closure.

A roller track and hinge arrangement serve to retrieve the door and return it into the stowed position and the air load is utilized to position the door in the deployed position.

DISCLOSURE OF INVENTION

An object of this invention is to provide for a fan jet engine an improved thrust reverser.

A feature of the invention is to utilize the splitter in the fan duct as a flow blockage for a portion of the duct and blocker doors cooperating therewith for the remaining portion. Another feature is the cam slot and roller arrangement for the blocker doors for deploying and stowing the same, and the elimination of blocker door drag links that in heretofore designs extends into the duct passageway.

Other features and advantages will be apparent from the specification and claims and from the accompanying drawings which illustrate an embodiment of the invention.

BRIEF DESCRIPTION OF THE DRAWING

FIG. 2 is a sectional view illustrating the invention in a thrust reversal mode.

FIG. 4 is a partial view in perspective showing the cam/roller arrangement for the blocker doors.

BEST MODE FOR CARRYING OUT THE INVENTION

Figure 1:
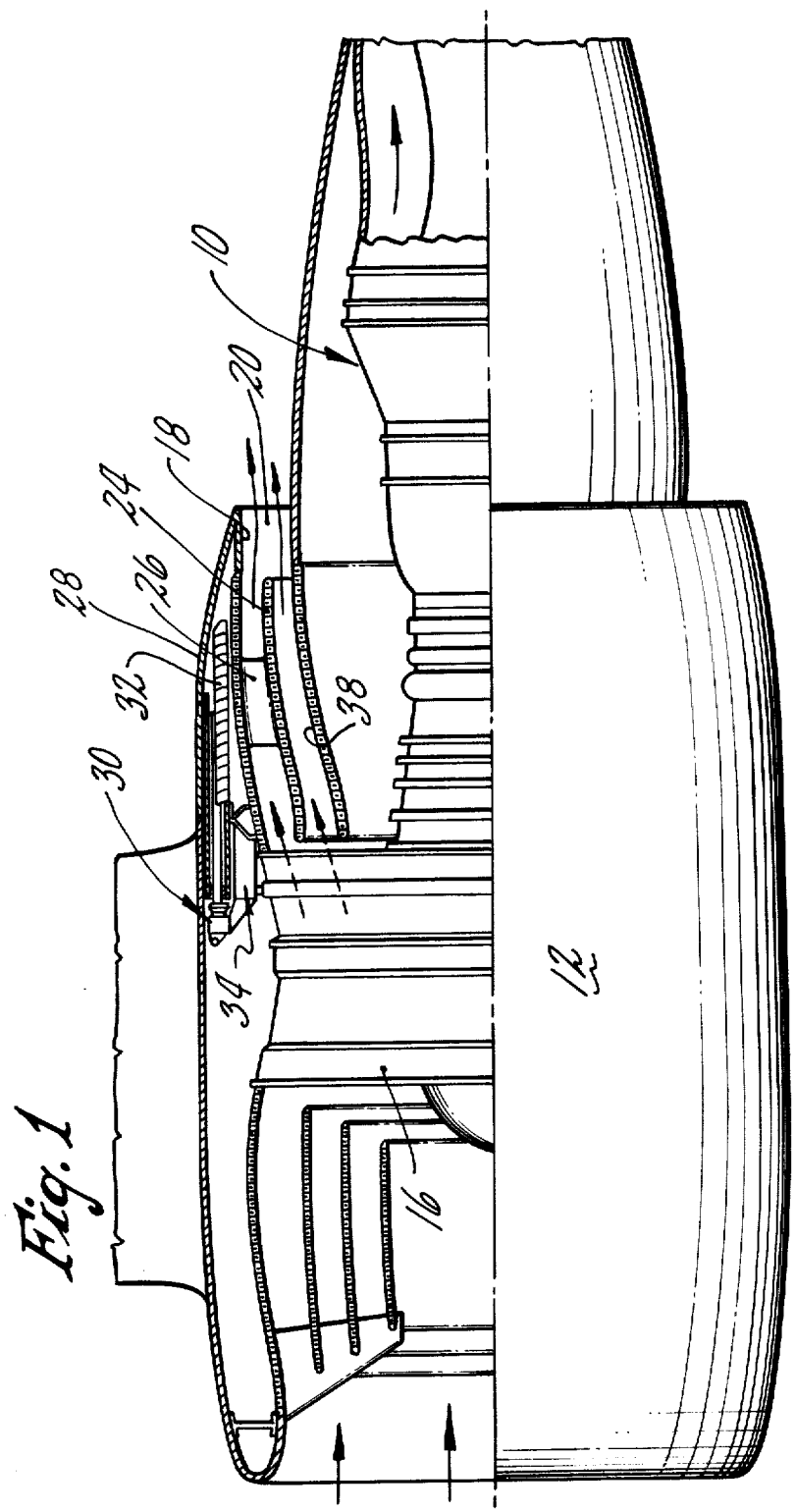
FIG. 1 is a view partly in section and partly in elevation illustrating the invention when thrust reversal is not in use.

As shown in FIG. 1, a fan jet engine generally illustrated by reference numeral 10 is suitably positioned in nacelle 12. For the sake of convenience and simplicity details of the construction of the engine and nacelle are omitted herefrom and for details thereof reference should be made, for example, to the JT-9D, manufactured by Pratt & Whitney Aircraft Group division of United Technologies Corporation, the assignee of this patent application.

Suffice it to say that fan air is accelerated by the fan 16, and discharges from duct 18 which defines with the compartment liner annular passageway 20. Disposed in the passageway is splitter 24 which serves to divide the fan air into coannular streams. The splitter 24 is supported in position by struts 26 which are affixed to the moveable aft section 28 of the nacelle 12. The view in FIG. 1 repreesnts the normal position of these component parts during all the flight envelope except for thrust reversing.

To effectuate thrust reversal the aft section 28 is positioned axially by any suitable actuator represented by the ball screw drive generally indicated by reference numeral 30. In the deployed position, the aft structure is moved rearwardly exposing the cascade 32 for redirecting the air in the fan discharge duct radially outward and forward to impart a vectoral force in a direction opposing the direction of the aircraft.

Simultaneousy, the blocker door 34 (one being shown) which comprises segments of circumferentially disposed doors, say twelve in number, is pivoted about hinge point 36 to bear against the outer surface of splitter 24. This blocks the flow in the outer coannular fan stream. The sheath 38 surrounding the power plant which defines compartments is formed to cooperate with splitter 24 a seal at the point 41 of contact so as to block off flow in the inner stream of the coannular fan streams.

Referring to FIGS. 2 and 3, a plurality of circumferentially spaced roller tracks 40 depend from the forward wall of nacelle 12 and each carry a cam slot 42 for receiving and guiding inner rollers 46. The inner rollers 46 are suitably and rotatably mounted on the cross shaft 48 that is supported to the blocker door 34 by the roller support element 51.

It is apparent from the foregoing that the roller guide element slides between adjacent roller tracks and upon contact, the rollers ride the cam slot 42 and raise and lower the blocker door 34 as the aft structure is moved axially. The blocker doors 34 are held in the closed position by the relative position of the inner roller 46 on the cam track 42. This is accomplished by the axial retention of the aft structure 18 by the ball screw actuators 30. Roller guide 50 is provided to stabilize the door after it has left the cam track 42 during deployment, to provide a positive stop to the rotation of the blocker door and to provide positive positioning of the inner rollers 46 as they approach the cam track 42 during the stow cycle. The roller guide 50 is attached to the aft translating structure 18 and provide a track 52 for the outer rollers 54.

It should be understood that the invention is not limited to the particular embodiments shown and described herein, but that various changes and modifications may be made without departing from the spirit and scope of this novel concept as defined by the following claims.

I claim:

1. A thrust reverser for a fan jet engine supported in a nacelle of an aircraft having an annular passageway for conducting flow discharging from the fan, splitter means in said passageway cooperating with the walls of said annular passageway cooperating with the walls of said annular passageway for defining coaxial passages for dividing said flow into two coannular streams, a cascade coaxially disposed relative to said splitter, said nacelle having a slidable annular structure nesting said cascade and moveable to expose it to said passageway for reversing the flow of fan discharge air into ambient for thrust reversal, means attaching said splitter to said annular structure for moving said splitter in the same direction as said annular structure, said splitter having one end contoured to bear against the inner wall of said annular passageway in the deployed position for blocking the flow of the inner coannular stream of said coannular streams and blocker door means moveable with said slideable annular structure to a flow blocking position for blocking the flow of the outer of said coannular streams whereby the flow discharging from said fan is diverted to flow through said cascade.

2. A thrust reverse as in claim 1 wherein said slideable annular structure of said nacelle has an inner wall, strut means supported to said inner wall supporting said splitter in spaced relation relative thereto.

3. A thrust reverser as in claim 2 including means for stowing said blocker door into said annular structure and unobstructing said passageway, said means including a fixed cam plate supported to the fixed structure of said nacelle, a cam slot in said cam plate for receiving roller followers supported to said blocker door for engaging said cam slot, and means for psitioning said roller followers into and out of said cam slot.

4. A thrust reverser as in claim 3 including radially spaced roller guide plates supported to said blocker door in interdigitation relationship with said fixed cam plate.

* * * * *